(12) United States Patent
Oh et al.

(10) Patent No.: US 8,828,758 B2
(45) Date of Patent: Sep. 9, 2014

(54) METHOD OF FABRICATING LIGHTWEIGHT AND THIN LIQUID CRYSTAL DISPLAY DEVICE

(75) Inventors: Jae-Young Oh, Goyang-si (KR); Woo-Sup Shin, Paju-si (KR); Sung-Ki Kim, Goyang-si (KR); Won-Sang Ryu, Goyang-si (KR); Kyung-Mo Son, Paju-si (KR); Jae-Won Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/338,034

(22) Filed: Dec. 27, 2011

(65) Prior Publication Data

US 2012/0231566 A1 Sep. 13, 2012

(30) Foreign Application Priority Data

May 12, 2011 (KR) .......................... 10-2011-0044669
Jun. 10, 2011 (KR) .......................... 10-2011-0056069

(51) Int. Cl.
*H01L 27/12* (2006.01)
*G02F 1/1333* (2006.01)
*G02F 1/1337* (2006.01)

(52) U.S. Cl.
CPC .......... *G02F 1/1333* (2013.01); *G02F 2202/28* (2013.01); *G02F 2001/133302* (2013.01)
USPC ................ 438/29; 438/458; 349/43; 349/123

(58) Field of Classification Search
CPC .............. H01L 27/1214; H01L 27/322; H01L 27/3232; H01L 27/3253; G02F 1/13; G02F 1/133308; G02F 1/33514; G02F 1/133516; G02F 1/337; G02F 1/13394; G02F 1/13452; G02F 2001/136222; G02F 2202/28
See application file for complete search history.

(56) References Cited

U.S. PATENT DOCUMENTS

| 2005/0083478 | A1* | 4/2005 | Lee et al. ...................... 349/156 |
| 2008/0100198 | A1* | 5/2008 | Kang ............................ 313/497 |
| 2011/0092006 | A1* | 4/2011 | An et al. ......................... 438/29 |
| 2011/0228189 | A1* | 9/2011 | Oh et al. ......................... 349/43 |
| 2012/0299147 | A1* | 11/2012 | Mitani .......................... 257/506 |

OTHER PUBLICATIONS

LG Display Co., Ltd., Frit Sealing, Sep. 23, 2008.
Nano Layer Bonding Using a Laser Beam, Kim et al, 2007.

* cited by examiner

*Primary Examiner* — Zandra Smith
*Assistant Examiner* — Pamela E Perkins
(74) *Attorney, Agent, or Firm* — Brinks Gilson & Lione

(57) ABSTRACT

A method of fabricating a liquid crystal display device includes forming a first adhesive pattern on a first auxiliary substrate; forming a first process panel by attaching a first substrate to the first auxiliary substrate using the first adhesive pattern; forming an array element on the first substrate; forming a second adhesive pattern on a second auxiliary substrate; forming a second process panel by attaching a second substrate to the second auxiliary substrate using the second adhesive pattern; forming a color filter element on the second substrate; attaching the first and second process panels with a liquid crystal panel between the first and second process panels; weakening an adhesive strength of the first and second adhesive patterns; and detaching the first and second auxiliary substrates from the first and second substrates, respectively.

25 Claims, 21 Drawing Sheets

METHOD OF FABRICATING LIGHTWEIGHT AND THIN LIQUID CRYSTAL DISPLAY DEVICE

This application claims the priority and the benefit under 35 U.S.C. §119(a) on Korean Patent Application No. 10-2011-0044669, filed on Mar. 12, 2011 and Korean Patent Application No. 10-2011-0056069, filed on Jun. 10, 2011, the entire contents of which are hereby incorporated by reference.

BACKGROUND

1. Field of the Invention

The present disclosure relates to a liquid crystal display device, and more particularly, to a method of fabricating a lightweight and thin liquid crystal display (LCD) device using a glass substrate having a thickness of about 0.1t (millimeter) to about 0.5t.

2. Discussion of the Related Art

Recently, as society has entered in earnest into the information age, the field of display devices that represent all sorts of electrical signals as visual images has developed rapidly. Particularly, since the LCD device has characteristics of light weight, thinness and low power consumption, the LCD device has been widely used as a substitute for a display device of cathode-ray tube type.

A related art liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by applying an electric field across the liquid crystal molecules. In other words, as the intensity or direction of the electric field is changed, the alignment of the liquid crystal molecules also changes. The LCD device includes a liquid crystal panel is formed by attaching an array substrate including a pixel electrode and a color filter substrate including a common electrode. The alignment direction of the liquid crystal molecules in a liquid crystal layer between the array substrate and the color filter substrate is controlled by an electric field, which is generated between the pixel and common electrodes, such that images can be displayed by controlling light transmissivity.

Since an active matrix LCD (AM-LCD) device has excellent characteristics of high resolution and displaying moving images, the AM-LCD device has been widely used. Particularly, the LCD device including a thin film transistor (TFT) as a switching element is referred to as a thin film transistor LCD (TFT-LCD) device.

FIG. 1 is an exploded perspective view of a related art liquid crystal panel. As shown in FIG. 1, the liquid crystal panel includes an array substrate 10, a color filter substrate 20, and a liquid crystal layer 30. The array substrate 10 and the color filter substrate 20 face each other, and The liquid crystal layer 30 is interposed therebetween.

The array substrate 10 includes a first substrate 12, a gate line 14, a data line 16, a thin film transistor (TFT) Tr, and a pixel electrode 18. The gate and data lines 14 and 16 are formed on the first substrate 12 and cross each other to define a pixel region P. The TFT Tr is formed at a crossing portion of the gate and data lines 14 and 16. The pixel electrode 18 is formed in the pixel region P and connected to the TFT T.

The color filter substrate 20 includes a second substrate 22, a black matrix 25, a color filter layer 26, and a common electrode 28. The black matrix 25 is formed on the second substrate 22 and has a lattice shape. The black matrix 25 corresponds to a non-display region of the first substrate 12. The non-display region of the first substrate 12 includes the gate and data lines 14 and 16 and the TFT T. The color filter layer 26 corresponds to the pixel region P and includes red, green and blue color filter patterns 26a, 26b and 26c. The common electrode 28 is formed on the black matrix 25 and the color filter layer 26. The common electrode 28 generates an electric field with the pixel electrode 18 such that the liquid crystal layer 30 is driven by the electric field.

Although not shown, a seal pattern is formed along edges of the first and second substrates 12 and 22. The seal pattern prevents the liquid crystal layer 30 overflowing. In addition, first and second alignment layers may be formed between the first substrate 12 and the liquid crystal layer 30 and between the second substrate 22 and the liquid crystal layer 30. First and second polarization plates may be formed on an outer surface of one of the first and second substrates 12 and 22.

A backlight assembly is formed on a rear side of the first substrate 12 to apply light into the liquid crystal panel. When a scan signal is applied to the TFT Tr through the gate line 14 to turn on the TFT Tr, an image signal is applied to the pixel electrode 18 through the data line 16 such that an electric field is generated between the pixel electrode 18 and the common electrode 28. As a result, the liquid crystal molecules in the liquid crystal layer 30 are driven by the electric field to display images.

Generally, a glass plate having transparent and insulating properties is used for the first and second substrates 12 and 22. Namely, a plurality of processes are conducted to form an array element and a color filter element are formed on the glass substrate. Unfortunately, the glass substrate is drooped, cracked or broken during the process or transport between the processes.

To prevent or minimize possibility of drooping, cracking or breaking problem, the glass substrate having an enough thickness of about 0.7t is used. However, the liquid crystal panel, which is fabricated using the 0.7t thickness glass substrate, is relatively heavy and thick such that there is a difficulty to produce a lightweight and thin LCD device. Particularly, with personal potable terminals such as a notebook computer, a personal digital assistant (PDA), the LCD device for the terminals is increasingly required to be lightweight and thin.

Accordingly, before attaching the first and second polarizing plates on the liquid crystal panel, the glass substrate of the liquid crystal panel is exposed to hydrofluoric (HF) solution and an outer side of the array substrate and the color filter substrate is etched such that the glass substrate for the array substrate and the color filter substrate has a thickness below about 0.5t.

However, as shown in FIG. 2, which is a schematic view illustrating an etching process of an outer side of the liquid crystal panel, the hydrofluoric solution is sprayed onto the both outer sides of the liquid crystal panel 50 using an etchant spray apparatus 90 such that an outer side of each of the array substrate 10 and the color filter substrate 20 is etched. Unfortunately, since an entire surface of the glass substrate is not uniformly etched, there are fine griffith flaws or concaves on an outer surface of the array substrate 10 and the color filter substrate 20 such that roughness is increased.

When the first and second polarizing plates are attached to the outer sides of the liquid crystal panel 50 having increased roughness, an adhesive property is reduced. In addition, since a portion of the concaves is thinner than other portions, strength of the glass substrate is weakened or reduced. Particularly, tensile strength is concentrated at the concaves such that cracks are generated and the glass substrate is broken.

In addition, since the etching process for the glass substrate with the HF solution is required ten to several tens minutes, production yield is reduced.

Moreover, 0.7t thickness glass substrate is more expensive than 0.5t thickness glass substrate. To produce the LCD device including 0.5t glass substrates by etching 0.7t glass substrates after producing the liquid crystal panel with 0.7t glass substrates is very inefficient in sides of cost and a fabricating processes.

Since costs of the etching process is about 55% of the production costs of the glass substrate (0.7t glass substrate cost+etching process cost), the LCD device loses price competitiveness because of the etching process.

BRIEF SUMMARY

A method of fabricating a liquid crystal display device includes forming a first adhesive pattern on a first auxiliary substrate having a first thickness; forming a first process panel by attaching a first substrate having a second thickness smaller than the first thickness to the first auxiliary substrate using the first adhesive pattern; forming an array element on the first substrate of the first process panel; forming a second adhesive pattern on a second auxiliary substrate having a third thickness; forming a second process panel by attaching a second substrate having a fourth thickness smaller than the third thickness to the second auxiliary substrate using the second adhesive pattern; forming a color filter element on the second substrate of the second process panel; attaching the first and second process panels with a liquid crystal panel between the first and second process panels; weakening an adhesive strength of the first and second adhesive patterns; and detaching the first and second auxiliary substrates from the first and second substrates, respectively.

In another aspect of the present invention, a method of fabricating a liquid crystal display device includes forming a first process panel by forming a first cover layer on a first substrate; forming an array element on the first substrate of the first process panel; forming a second process panel by forming a second cover layer on a second substrate; forming a color filter element on the second substrate of the second process panel; and attaching the first and second process panels with a liquid crystal panel between the first and second process panels, wherein each of the first and second cover layers is formed of a diamond-like carbon material or a glass fiber-reinforced material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE DRAWINGS AND THE PRESENTLY PREFERRED EMBODIMENTS

Reference will now be made in detail to the preferred embodiments, examples of which are illustrated in the accompanying drawings.

In the present invention, a glass substrate, which has a thickness of about 0.1t to 0.5t, is obtained without an etching process. A drooping problem of the glass substrate is minimized. An array substrate and a color filter substrate are fabricated with the glass substrate without damages on the glass substrate during a transport between fabricating processes.

Since the glass substrate having the 0.1t to 0.5t thickness is easily drooped, a center of the glass substrate is hung. Accordingly, there are problems for transporting by a transporting means such as a cassette. In addition, when the glass substrate is loaded or unloaded into a process apparatus, the drooping problem is strongly caused by a small impact such that a mis-align problem is generated. As a result, the glass substrate may be broken by crashing with elements of the process apparatus.

In a first embodiment of the present invention, to avoid the drooping or breaking problem, an auxiliary substrate is used. Namely, by attaching the glass substrate having the 0.1t to 0.5t thickness with the auxiliary substrate, the glass substrate with the auxiliary substrate has a drooping property problem being substantially the same as or being smaller than the 0.7t thickness glass substrate. The glass substrate is easily attached on and detached from auxiliary substrate, and an expansion rate of the auxiliary substrate is similar to that of the glass substrate.

FIGS. 3A to 3I are cross-sectional views showing processes of fabricating an LCD device according to a first embodiment of the present invention.

Figure 1:
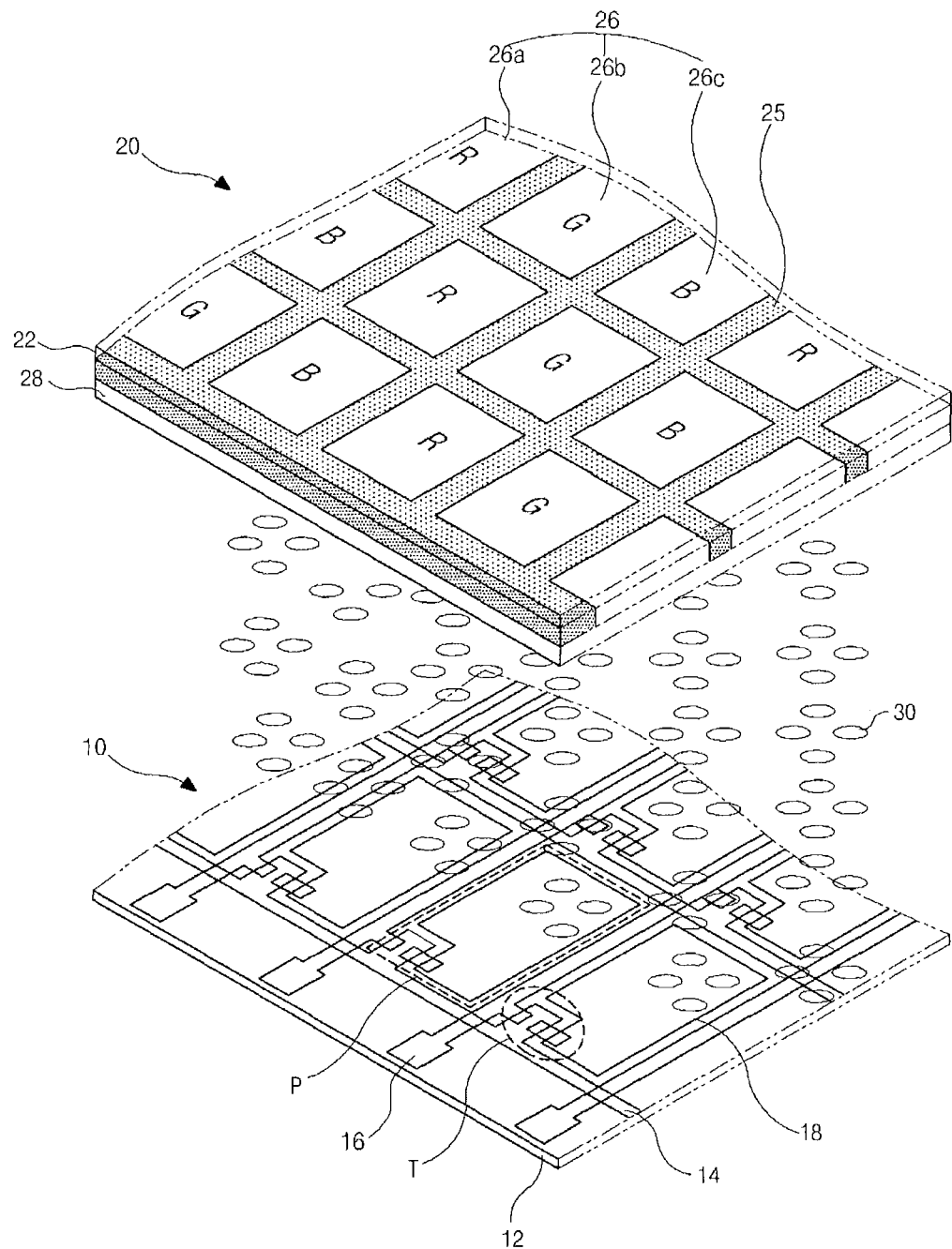
FIG. 1 is an exploded perspective view of a related art liquid crystal panel.
Figure 2:
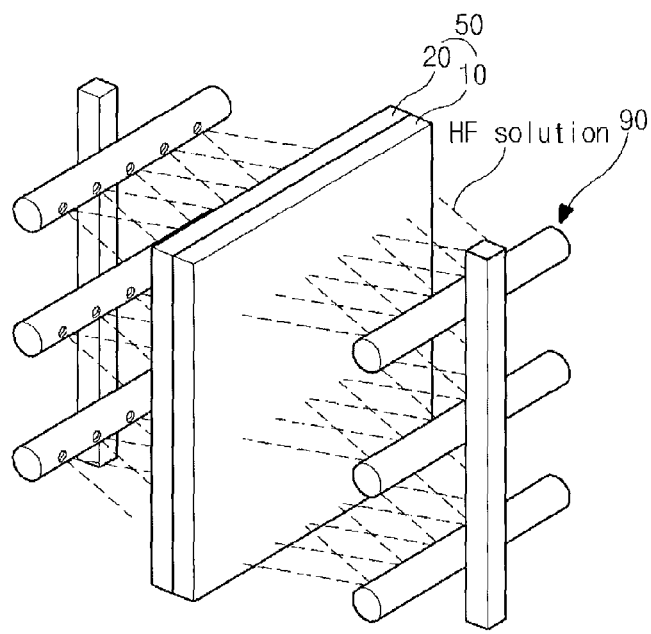
FIG. 2 is a schematic view illustrating an etching process of an outer side of the liquid crystal panel.
Figure 3A:
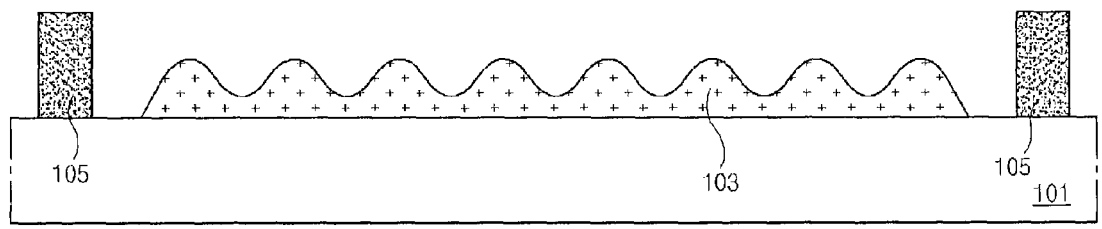
FIGS. 3A to 3I are cross-sectional views showing processes of fabricating an LCD device according to a first embodiment of the present invention.

As shown in FIG. 3A, a first adhesive pattern 105 is formed along edges of a first auxiliary substrate 101 by coating an adhesive material. The first adhesive pattern 105 may be formed of silicon based material. For example, the first adhesive pattern 105 may be formed of phenyl based material such as silsesquioxane and polydimethylsiloxane (PDMS) or an acryl based adhesive material.

The adhesive property of the first adhesive pattern 105 is maintained without changes of other properties for a process temperature above 230° C. The first adhesive pattern 105 looses the adhesive property by a solvent or a laser beam such that a first process substrate 110 (of FIG. 3B) is easily detached from the first auxiliary substrate 101. In addition, after the first auxiliary substrate 101 is detached, there is no adhesive material on the first process substrate 110.

The first auxiliary substrate 101 may be formed of the same material as the first process substrate 110. Namely, the first auxiliary substrate 101 may be formed of glass. As a result, the first auxiliary substrate 101 has substantially the same thermal expansion rate as the first process substrate 110 such that mis-align according to expansion or contraction during the process is prevented.

In addition, the first auxiliary substrate 101 has a thickness above 0.4t . For example, the first auxiliary substrate 101 has a thickness of 0.4t to 1.0t . The first process substrate 110 having about 0.1t thickness is attached to the first auxiliary substrate 101 having about 0.4t thickness with the adhesive pattern 105 such that a total thickness of a process panel 192 (of FIG. 3C) is above 0.5t . The process panel 192 has a drooping problem being substantially the same as the 0.7t thickness glass substrate. Accordingly, there is no problem in processing the process panel 192 having a thickness of about 0.5t in the manufacturing line of the LCD device.

In addition, the first auxiliary substrate 101 is formed the same material and has a similar thickness as the glass substrate of the array substrate and the color filter substrate for the related art LCD device, the first auxiliary substrate 101 can be inputted into the related art LCD device manufacturing line without controlling process conditions.

On the other hand, a first uneven pattern 103 such as an embossing pattern is formed on the first auxiliary substrate 101. Due to the first uneven pattern 103, the first process substrate 110 is easily detached from the first auxiliary substrate 101. For example, an inorganic insulating material layer (not shown) or an organic insulating material layer (not shown) is formed on the first auxiliary substrate 101 by depositing an inorganic insulating material, such as silicon oxide and silicon nitride, or coating an organic insulating material, such as photo-acryl, benzocyclobutene, and polyimide. The inorganic insulating material layer or an organic insulating material layer is patterned by a mask process, which includes a step of forming a photo-resist (PR) layer, a step of exposing, a step of developing and a step of etching, to form an uneven surface.

The first uneven pattern 103 is positioned in a space between the first adhesive pattern 105. Namely, the first adhesive pattern 105 is formed at edges of the first auxiliary substrate 101, and the first uneven pattern 103 is formed at a center of the first auxiliary substrate 101. For example, after forming the first uneven pattern 103, the first adhesive pattern 105 is formed at the edges of the first auxiliary substrate 101 using a syringe (not shown). Alternatively, after forming the first adhesive pattern 105, the first uneven pattern 103 is formed at the center of the first auxiliary substrate 101 using a syringe (not shown).

Figure 3B:
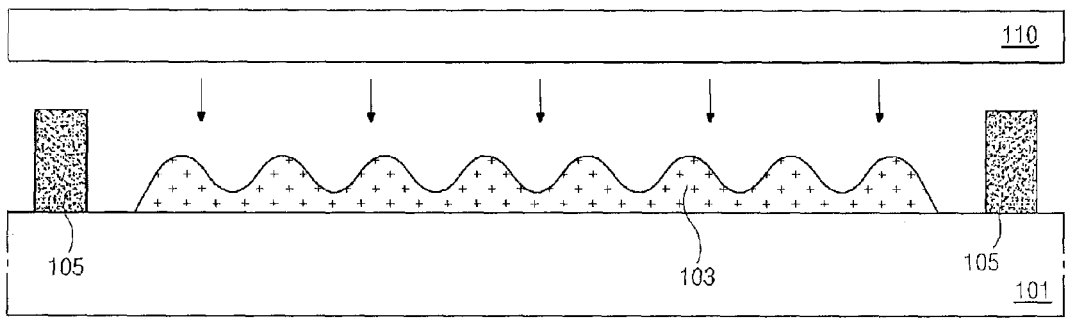

Next, as shown in FIG. 3B, the first process substrate 110, which is formed of glass and has a thickness of about 0.1t to about 0.5t , is disposed over the first auxiliary substrate 101 including the first uneven pattern 103 and the first adhesive pattern 105. The first process substrate 110 has a thickness smaller than the first auxiliary substrate 101. The first process substrate 110 is attached with the first auxiliary substrate 101, and the first adhesive pattern 105 is cured. The attached the first process substrate 110 and the first auxiliary substrate 101 are referred to as the first process panel 192.

Before attaching the first process substrate 110 to the first auxiliary substrate 101, a thickness of the first adhesive pattern 105 is larger than that of the first uneven pattern 103. When the first process substrate 110 is attached to the first auxiliary substrate 101, the first process panel 192 is pressed such that the thickness of the first adhesive pattern 105 is reduced to be substantially equal to the thickness of the first uneven pattern 103. Accordingly, the first process substrate 110 is supported by both the first adhesive pattern 105 and the first uneven pattern 103.

Since the first process substrate 110 and the first auxiliary substrate 101 of the first process panel 192 are formed of glass, a thermal expansion of the first process substrate 110 and the first auxiliary substrate 101 is same such that there is no problem, e.g., a drooping problem, resulting from a difference in a thermal expansion during the fabricating process.

In addition, since the first process substrate 110 having a thickness of 0.1t to 0.5t is attached with the first auxiliary substrate 101, a drooping problem of the first process panel 192 is substantially same as or less than the 0.7t thickness glass substrate. As a result, there is no problem in processing the process panel 192 in the related art LCD device manufacturing line.

Figure 3C:
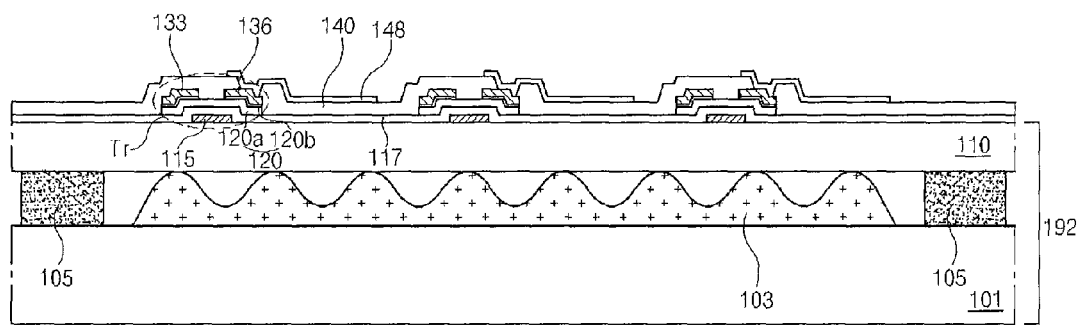

Next, as shown in FIG. 3C, array elements are formed on the first process substrate 110 of the first process panel 192. Namely, a gate line (not shown) and a data line (not shown) are formed with a gate insulating layer 117 therebetween. The gate and data lines cross each other to define a pixel region. In the pixel region, a thin film transistor (TFT) Tr as a switching element is formed at a crossing portion of the gate and data lines. For example, the TFT Tr may include a gate electrode 115, a semiconductor layer 120, which includes an active layer 120a of intrinsic amorphous silicon and an ohmic contact layer 120b of impurity-doped amorphous silicon, a source electrode 133 and a drain electrode 136. The gate electrode 115 is connected to the gate line, and the source electrode 133 is connected to the data line. The drain electrode 136 is spaced apart from the source electrode 133. A passivation layer 140 is formed on the TFT Tr. The passivation layer 140 includes a contact hole to expose the drain electrode 136 of the TFT Tr. A pixel electrode 148 is formed on the passivation layer 140. The pixel electrode 148 contacts the drain electrode 136 through the contact hole. The pixel electrode 148 is formed of a transparent conductive material.

Figure 3D:
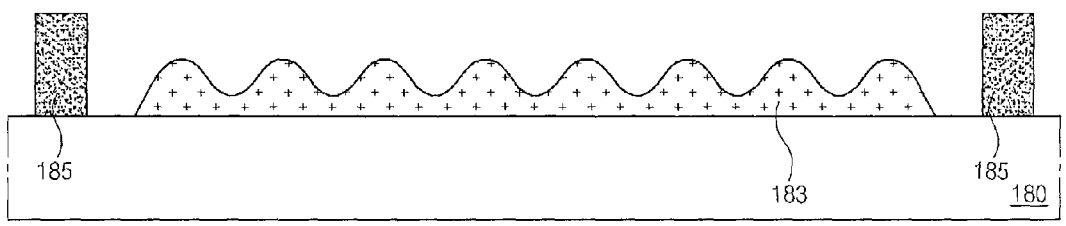

Next, as shown in FIG. 3D, a second adhesive pattern 185 is formed along edges of a second auxiliary substrate 180 by coating an adhesive material. The second adhesive pattern 185 is formed of the same material as the first adhesive pattern 105. A second uneven pattern 183 such as an embossing pattern is formed on the second auxiliary substrate 180. The second uneven pattern 183 is positioned in a space between the second adhesive pattern 185. Namely, the second adhesive pattern 185 is formed at edges of the second auxiliary substrate 180, and the second uneven pattern 183 is formed at a center of the second auxiliary substrate 180. For example, after forming the second uneven pattern 183, the second adhesive pattern 185 is formed at the edges of the second auxiliary substrate 180.

Figure 3E:
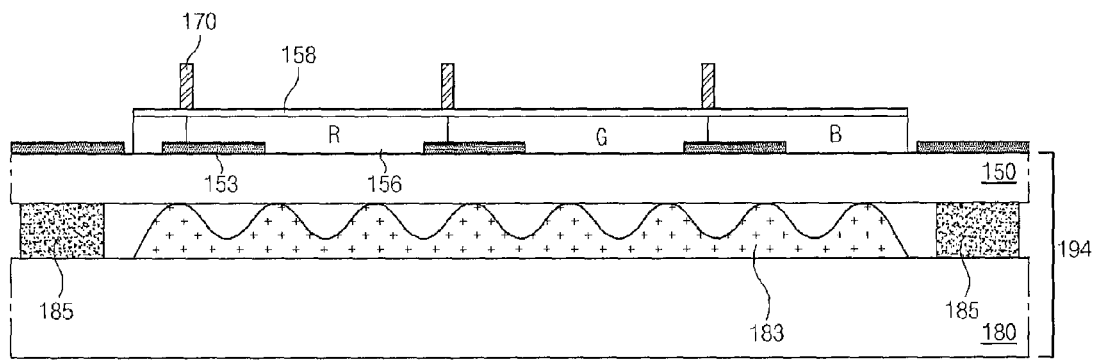

Next, as shown in FIG. 3E, a second process substrate 150, which is formed of glass and has a thickness of about 0.1t to about 0.5t , is disposed over the second auxiliary substrate 180 including the second uneven pattern 183 and the second adhesive pattern 185. The second process substrate 150 is attached with the second auxiliary substrate 180, and the second adhesive pattern 185 is cured. The attached the second process substrate 150 and the second auxiliary substrate 180 are referred to as a second process panel 194. The second process substrate 150 has a thickness smaller than the second auxiliary substrate 180.

Next, color filter elements are formed on the second process substrate 150 of the second process panel 194. Namely, a black matrix 153 is formed at boundaries of the pixel region, and a color filter layer 156 including red, green and blue color filter patterns is formed in the pixel region. Next, a common electrode 158 is formed on the color filter layer 156 by depositing a transparent conductive material. A patterned spacer 170 having a pre-determined height is formed on the common electrode 158. The patterned spacer 170 may correspond to the black matrix 153.

During these color filter processes, there is no damage on the second process substrate 150 because a drooping problem of the second process panel 194 is substantially same as the 0.7t thickness glass substrate.

Figure 3F:
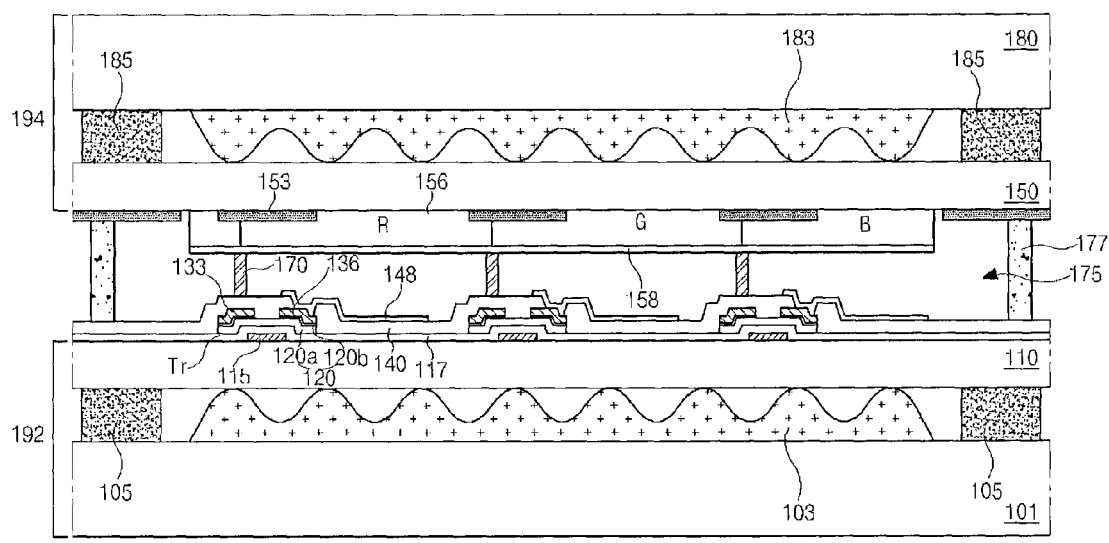

Next, as shown in FIG. 3F, a seal pattern 177 is formed at edges of one of the first and second process panels 192 and 194. Then, the first and second process panels 192 and 194 are disposed such that the pixel electrode 148 faces the common electrode 158. Next, a liquid crystal layer 175 is formed in a space inside the seal pattern 177, and the first and second process panels 192 and 194 are attached such that the patterned spacer 170 contacts the passivation layer 140.

Figure 3G:
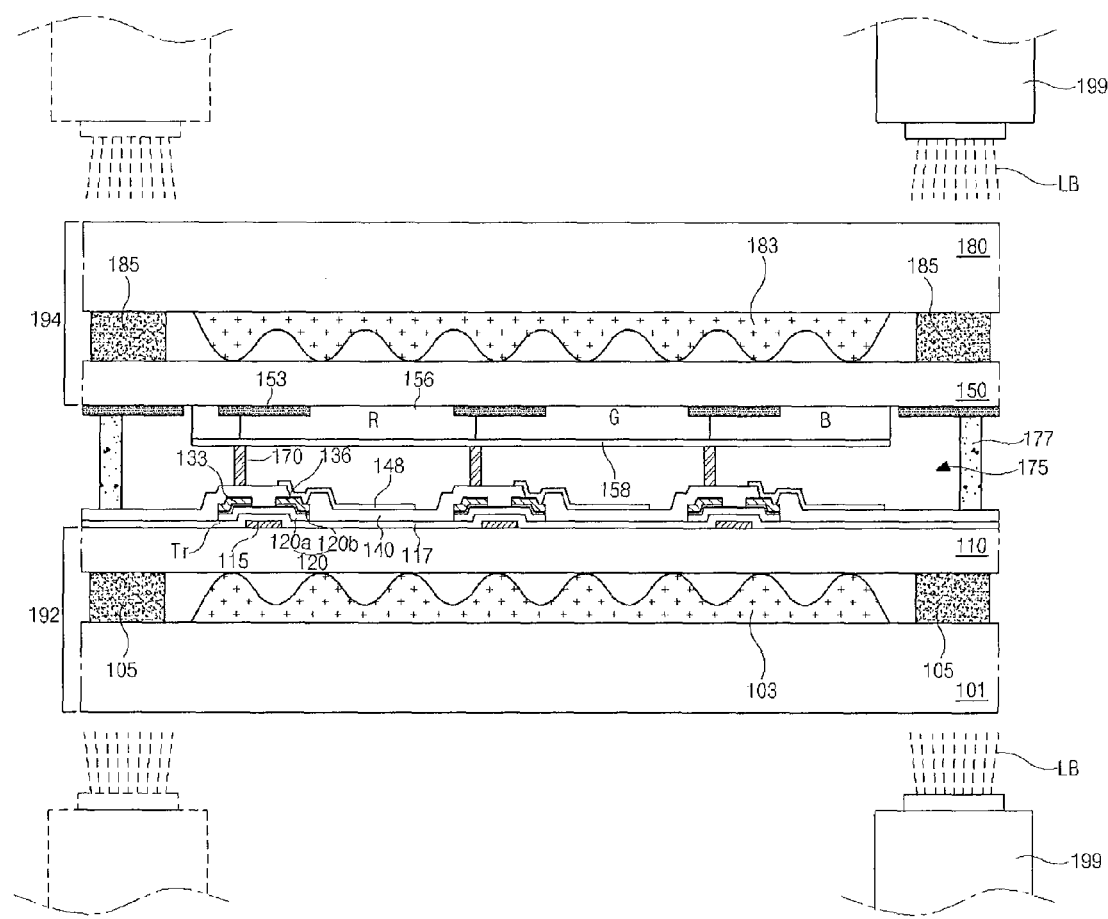

Next, as shown in FIG. 3G, a laser beam LB is irradiated onto an outer side of the first and second process panels 192 and 194 using a laser irradiating apparatus 199. The laser beam LB is irradiated to the first and second adhesive patterns 105 and 185 such that a laser ablation process is conducted. As a result, each of the first and second adhesive patterns 105 and 185 looses the adhesive property, or the adhesive property of each of the first and second adhesive patterns 105 and 185 is weakened or reduced. The laser beam LB may be focused on a contact portion between the first adhesive pattern 105 and the first process substrate 110 and between the second adhesive pattern 185 and the second process substrate 150.

Figure 3H:
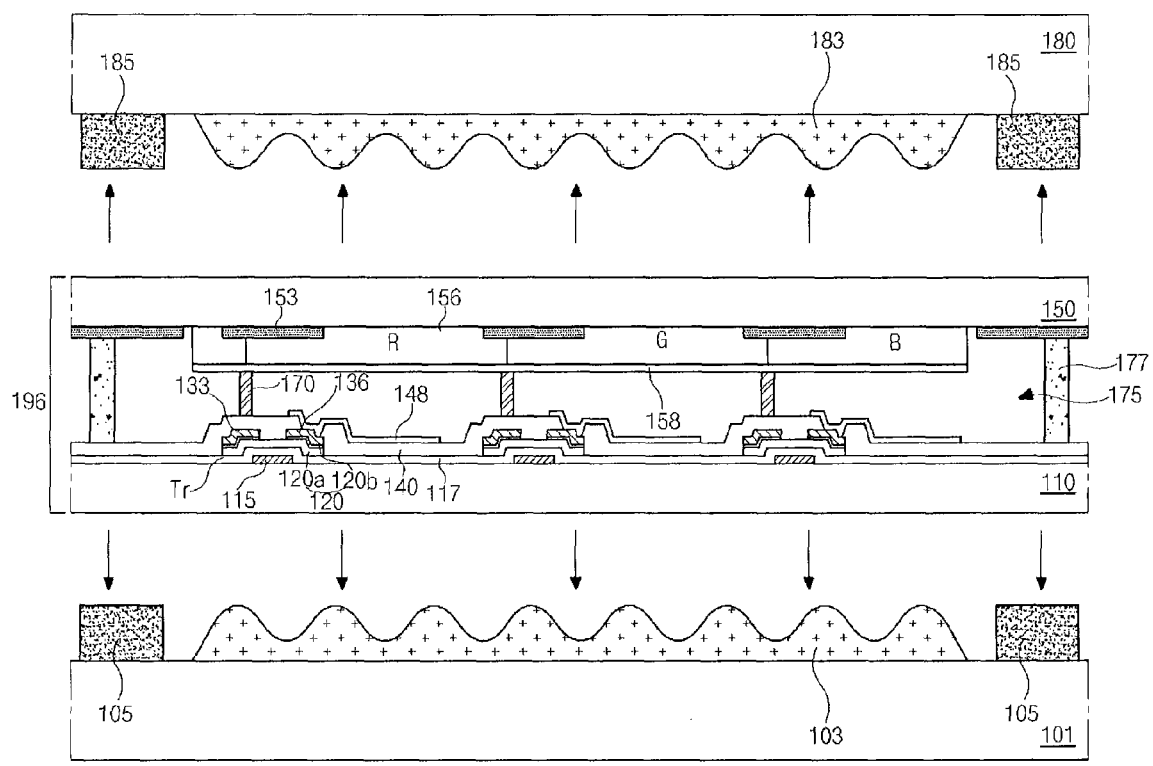

Next, as shown in FIG. 3H, the first auxiliary substrate 101 is detached from the first process substrate 110, and the second auxiliary substrate 180 is detached from the second process substrate 150. As a result, a liquid crystal panel 196 including the first and second process substrates 110 and 150, each of which has a thickness of about 0.1t to about 0.5t, is obtained.

Since an adhesive strength of the first and second adhesive patterns 105 and 185 to the first and second process substrates 110 and 150 is weakened or reduced by the laser beam LB, the first and second auxiliary substrates 101 and 180 are easily detached from the liquid crystal panel 196.

FIGS. 3G and 3H show a process of irradiating the laser beam LB and detaching the first and second auxiliary substrates 101 and 180. Alternatively, after the first and second adhesive patterns 105 and 185 are exposed to an etchant for etching the first and second adhesive patterns 105 and 185, the first and second auxiliary substrates 101 and 180 may be detached from the liquid crystal panel 196.

The first and second auxiliary substrate 101 and 180, which are detached from the liquid crystal panel 196, may be recycled after removing the first and second adhesive patterns 105 and 185. Namely, after completely removing the first and second adhesive patterns 105 and 185, which loose an adhesive property by a laser ablation, from the first and second auxiliary substrates 101 and 180, new first and second adhesive patterns are respectively formed on the first and second auxiliary substrates 101 and 180 in order to recycle.

Each of the first and second process substrates 110 and 150 has a thickness of about 0.1t to about 0.5t. However, since the first and second process substrates 110 and 150 are attached to from the liquid crystal panel 196, a drooping problem of the liquid crystal panel 196 is not generated. In addition, even if the liquid crystal panel 196 is drooped, the liquid crystal panel 196 is drooped to little more than a single glass substrate of 0.1t to 0.7t thickness. Accordingly, there is no problem, e.g., a drooping problem, in the liquid crystal panel 196 during other processes.

Figure 3I:
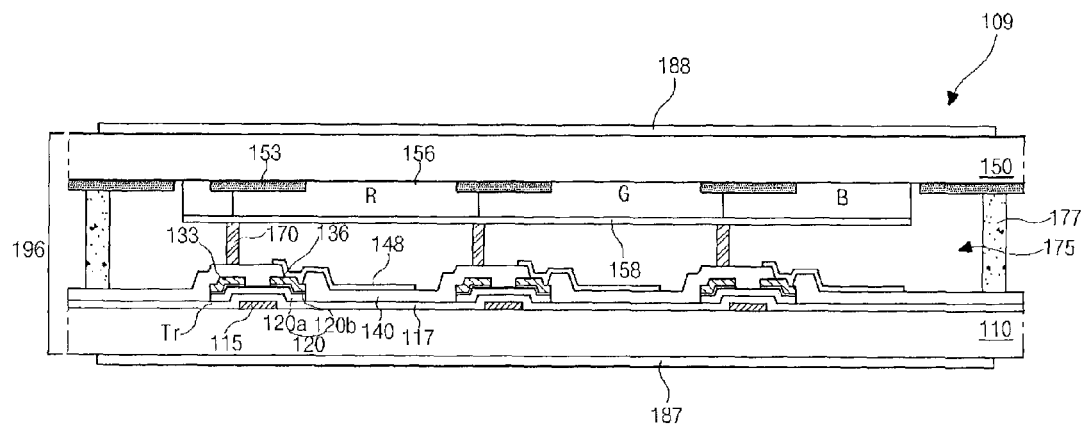

Next, as shown in FIG. 3I, first and second polarizing plates 187 and 188 are attached to an outer side of the first and second process substrates 110 and 150, respectively, such that an LCD device 109 is obtained.

The LCD device, which is fabricated by the above processes and has the 0.1t to 0.5t thickness substrate, has a total thickness smaller than the related art LCD device including the 0.7t thickness glass substrate. In addition, the above LCD device has a weight smaller than the related LCD device. Namely, the LCD device according to the present invention has a lightweight and thin profile.

In addition, since an etching process of an outer side of substrates of a liquid crystal panel to reduce a thickness of the substrates is not required, production yield is improved. Moreover, the 0.1t to 0.5t thickness substrate, which is cheaper than 0.7t thickness substrate, is used such that production cost is reduced. Furthermore, by using the auxiliary substrate, problems, e.g., a drooping problem, are not caused even though a thinner substrate is used.

FIGS. 3A to 3I show the LCD device including the pixel electrode 148 on the first process substrate 110 and the common electrode 158 on the second process substrate 150. Alternatively, a lightweight and thin profile type in-plane switching (IPS) mode LCD device including the common electrode, which is connected to a common line, on the first process substrate with the pixel electrode may be fabricated. In this case, the pixel electrode and the common electrode have a bar shape and are alternately arranged with each other. On the second process substrate, the black matrix, the color filter layer and an overcoat layer without the common electrode are formed. The common line may be formed on the same layer and of the same material as the gate electrode.

With the IPS mode LCD device, a transparent electrode as an anti-static electrode, which is formed of a transparent conductive material such as indium-tin-oxide (ITO) and indium-zinc-oxide (IZO), is disposed on an outer surface of the second process substrate. The transparent electrode for preventing damages by a static electricity may be formed before attaching the second auxiliary substrate 180. Alternatively, the transparent electrode may be formed before attaching the second polarizing plate 188 and after detaching the second auxiliary substrate 180.

In second and third embodiments of the present invention, to avoid the drooping or breaking problem, an auxiliary substrate is attached to a glass substrate, which has a thickness about 0.1t to about 0.5t, or a passivation film is formed on the glass substrate. Namely, by attaching the glass substrate having the 0.1t to 0.5t thickness with the auxiliary substrate or forming the passiation film on the glass substrate, the glass substrate with the auxiliary substrate or the passivation layer has a drooping problem being substantially the same as the 0.7t thickness glass substrate. Accordingly, even though a relatively thin glass substrate is used for the LCD device, there is no damage, e.g., a drooping problem, on the glass substrate during fabricating processes.

FIGS. 4A to 4I are cross-sectional views showing processes of fabricating an LCD device according to a second embodiment of the present invention.

Figure 4A:
FIGS. 4A to 4I are cross-sectional views showing processes of fabricating an LCD device according to a second embodiment of the present invention.

As shown in FIG. 4A, a first adhesive pattern 205 is formed along edges of a first auxiliary substrate 201 by coating an adhesive material using a syringe and providing a heat or irradiating a laser beam. Namely, after coating the adhesive material, the adhesive material is cured by the heat or the laser beam. The first adhesive pattern 205 is formed of silicon based material. For example, the first adhesive pattern 205 may be formed of phenyl based silsesquioxane, phenyl based Polydimethylsiloxane (PDMS) or an acryl based adhesive material. The above material is cured by a heat or a laser beam.

Figure 5A:
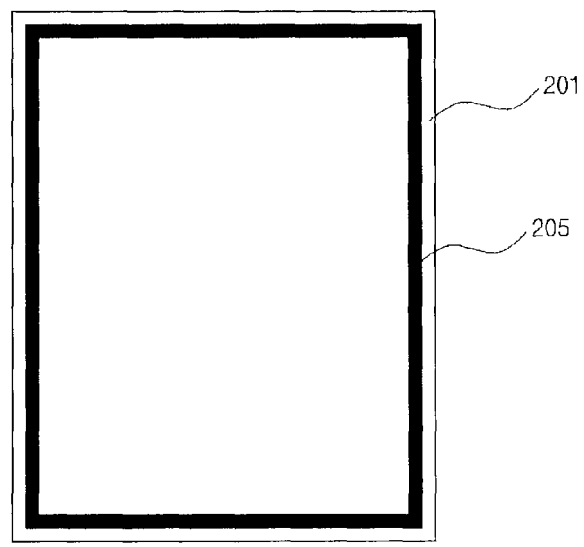
FIGS. 5A to 5D are schematic views showing first adhesive patterns used for a fabricating process of an LCD device according to a second embodiment of the present invention.
Figure 5B:
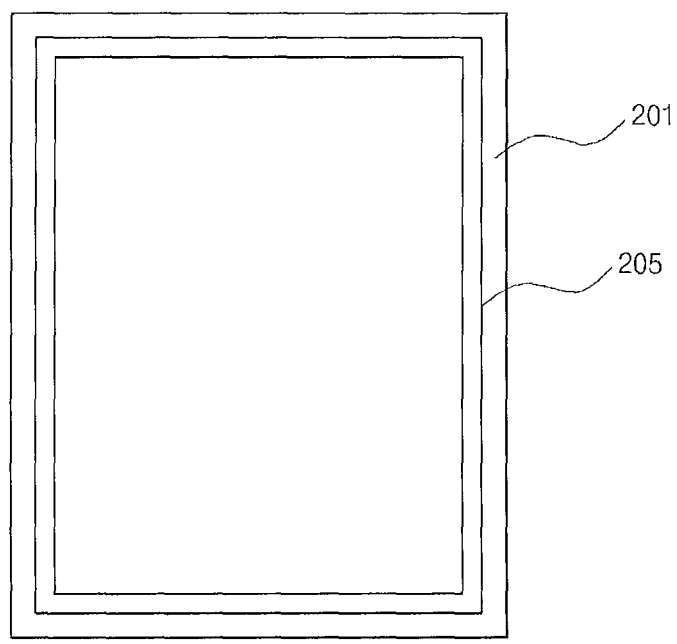
Figure 5C:
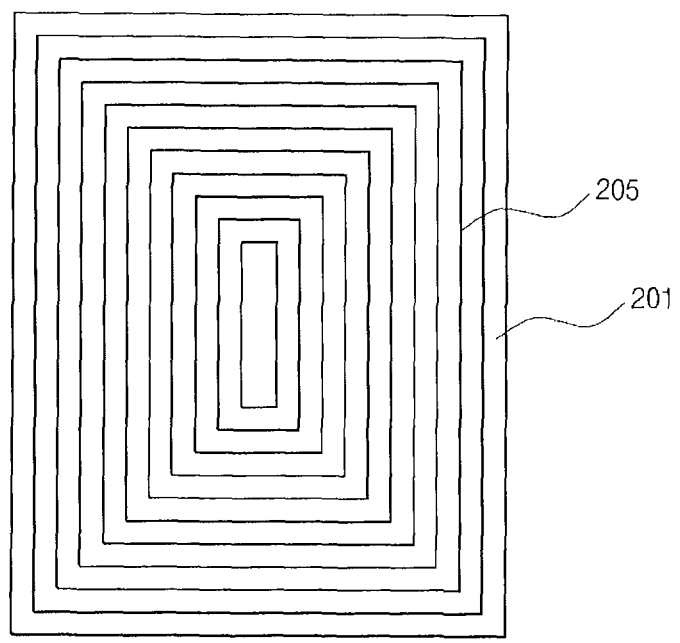
Figure 5D:
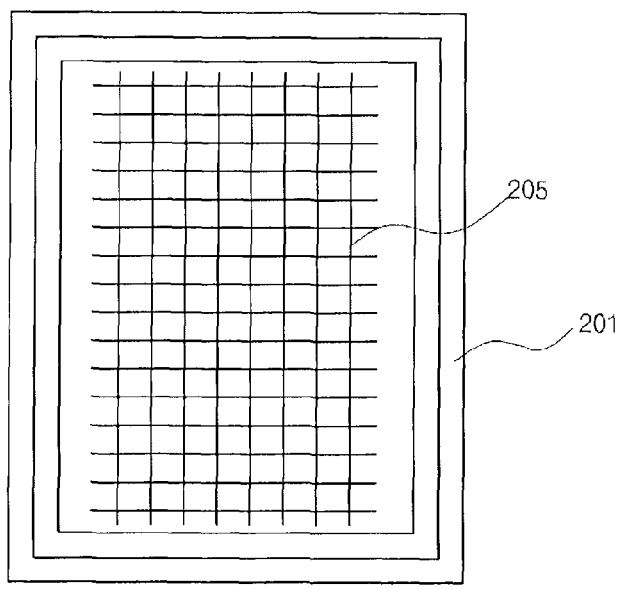

In this case, the shape of the first adhesive pattern 205 is variously modified as shown in FIGS. 5A to 5D. As shown in FIG. 5A, the first adhesive pattern 205 may have a single rectangular shape. Namely, the first adhesive pattern 205 has the same shape as the first auxiliary substrate 201. As shown in FIG. 5B, the first adhesive pattern 205 may have a dual rectangular shape. As shown in FIG. 5C, the first adhesive pattern 205 may have a multi rectangular shape. Namely, a plurality of rectangular patterns, which have different size, form the first adhesive pattern 205. As shown in FIG. 5D, the first adhesive pattern 205 may have a lattice shape. FIG. 4A shows the first adhesive pattern 205 having a single rectangular shape.

On the other hand, the first adhesive pattern 205 may be formed of a frit. The first paste is coated using a syringe or screen-printed such that the first adhesive pattern 205 has a shape of one shown in FIGS. 5A to 5D.

The first auxiliary substrate 201 may be formed of the same material as the first process substrate 192 (of FIG. 4B) and has a thickness above 0.5t. For example, the first auxiliary substrate 201 has a thickness of 0.5t to 1.0t. Namely, the first auxiliary substrate 201 may be formed of glass. As a result, the first auxiliary substrate 201 has substantially the same thermal expansion rate as the first process substrate 192 such that mis-align according to expansion or contraction during the process is prevented.

In addition, the first auxiliary substrate 201 is formed the same material and has a similar thickness as the glass substrate of the array substrate and the color filter substrate for the related art LCD device, the first auxiliary substrate 201 can be inputted into the related art LCD device manufacturing line without controlling process conditions.

Figure 4B:
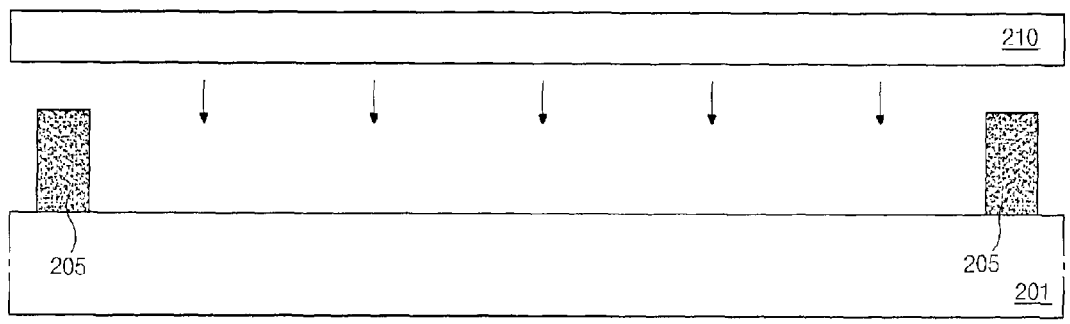

Next, as shown in FIG. 4B, the first process substrate 210, which is formed of glass and has a thickness of about 0.1t to about 0.5t, is disposed over the first auxiliary substrate 101 including the first adhesive pattern 205. The first process substrate 210 is attached with the first auxiliary substrate 201, and the first adhesive pattern 205 is cured. The attached the first process substrate 210 and the first auxiliary substrate 201 are referred to as a first process panel 292 (of FIG. 4C). The first process substrate 210 has a thickness smaller than the first auxiliary substrate 201.

When the first adhesive pattern 205 is formed of a thermally cured adhesive material or laser cured adhesive material, a heat or a laser beam is irradiated to cure the first adhesive pattern 205. Alternatively, when the first adhesive pattern 205 is formed of a frit, a heat and a laser beam are sequentially irradiated to cure the first adhesive pattern 205.

Since the first process substrate 210 and the first auxiliary substrate 201 of the first process panel 292 are formed of glass, a thermal expansion of the first process substrate 210 and the first auxiliary substrate 201 is same such that there is no problem, e.g., a drooping problem, resulting from a difference in a thermal expansion during the fabricating process.

In addition, since the first process substrate 210 having a thickness of 0.1t to 0.5t is attached with the first auxiliary substrate 201, a drooping problem of the first process panel 292 is substantially same as or less than the 0.7t thickness glass substrate. As a result, there is no problem in processing the process panel 292 in the related art LCD device manufacturing line.

Figure 4C:
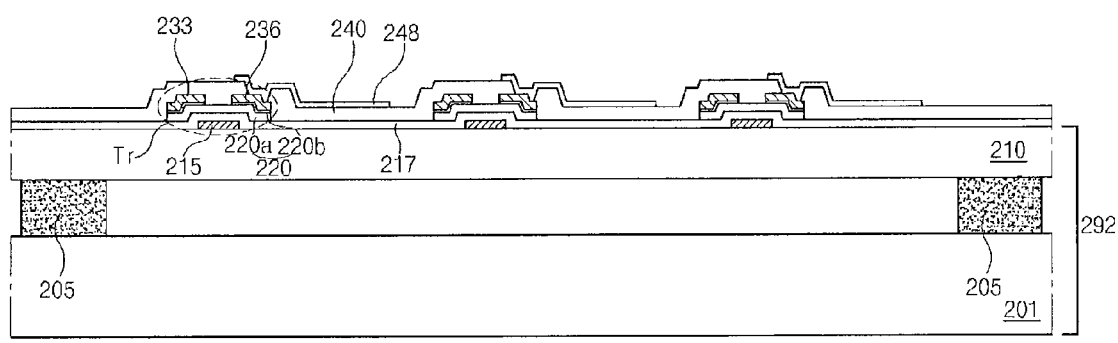

Next, as shown in FIG. 4C, array elements are formed on the first process substrate 210 of the first process panel 292. Namely, a gate line (not shown) and a data line (not shown) are formed with a gate insulating layer 217 therebetween. The gate and data lines cross each other to define a pixel region. In the pixel region, a thin film transistor (TFT) Tr as a switching element is formed at a crossing portion of the gate and data lines. For example, the TFT Tr may include a gate electrode 215, a semiconductor layer 220, which includes an active layer 220a of intrinsic amorphous silicon and an ohmic contact layer 220b of impurity-doped amorphous silicon, a source electrode 233 and a drain electrode 236. The gate electrode 215 is connected to the gate line, and the source electrode 233 is connected to the data line. The drain electrode 236 is spaced apart from the source electrode 233. A passivation layer 240 is formed on the TFT Tr. The passivation layer 240 includes a contact hole to expose the drain electrode 236 of the TFT Tr. A pixel electrode 248 is formed on the passivation layer 240. The pixel electrode 248 contacts the drain electrode 236 through the contact hole. The pixel electrode 248 is formed of a transparent conductive material.

Figure 4D:
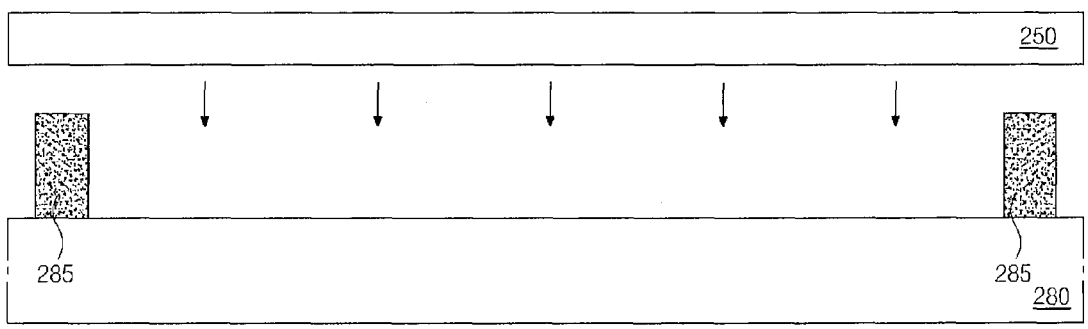

Next, as shown in FIG. 4D, a second adhesive pattern 285 is formed along edges of a second auxiliary substrate 280 by coating an adhesive material. The second auxiliary substrate 280 may have substantially the same thickness and be formed of substantially the same material as the first auxiliary substrate 201. The second adhesive pattern 285 may have substantially the same shape and be formed of substantially the same material as the first adhesive pattern 205. FIG. 4D shows the second adhesive pattern 285 of a single rectangular shape.

Next, a second process substrate 250, which is formed of glass and has a thickness of about 0.1t to about 0.5t, is disposed over the second auxiliary substrate 280 including and the second adhesive pattern 205. The second process substrate 250 is attached with the second auxiliary substrate 280, and the second adhesive pattern 285 is cured. The attached the second process substrate 250 and the second auxiliary substrate 280 are referred to as a second process panel 294. The second process substrate 250 has a thickness smaller than the second auxiliary substrate 280.

When the second adhesive pattern 285 is formed of a thermally cured adhesive material or laser cured adhesive material, a heat or a laser beam is irradiated to cure the second adhesive pattern 285. Alternatively, when the second adhesive pattern 285 is formed of a frit, a heat and a laser beam are sequentially irradiated to cure the second adhesive pattern 285.

Figure 4E:
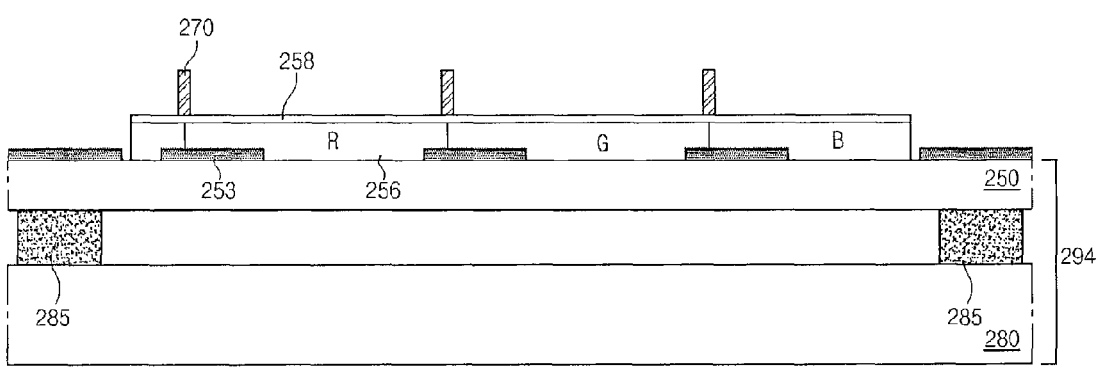

Next, as shown in FIG. 4E, color filter elements are formed on the second process substrate 250 of the second process panel 294. Namely, a black matrix 253 is formed at boundaries of the pixel region, and a color filter layer 256 including red, green and blue color filter patterns is formed in the pixel region. Next, a common electrode 258 is formed on the color filter layer 256 by depositing a transparent conductive material. A patterned spacer 270 having a pre-determined height is formed on the common electrode 258. The patterned spacer 270 may correspond to the black matrix 253.

During these color filter processes, there is no damage on the second process substrate 250 because a drooping problem of the second process panel 294 is substantially same as the 0.7t thickness glass substrate.

Figure 4F:
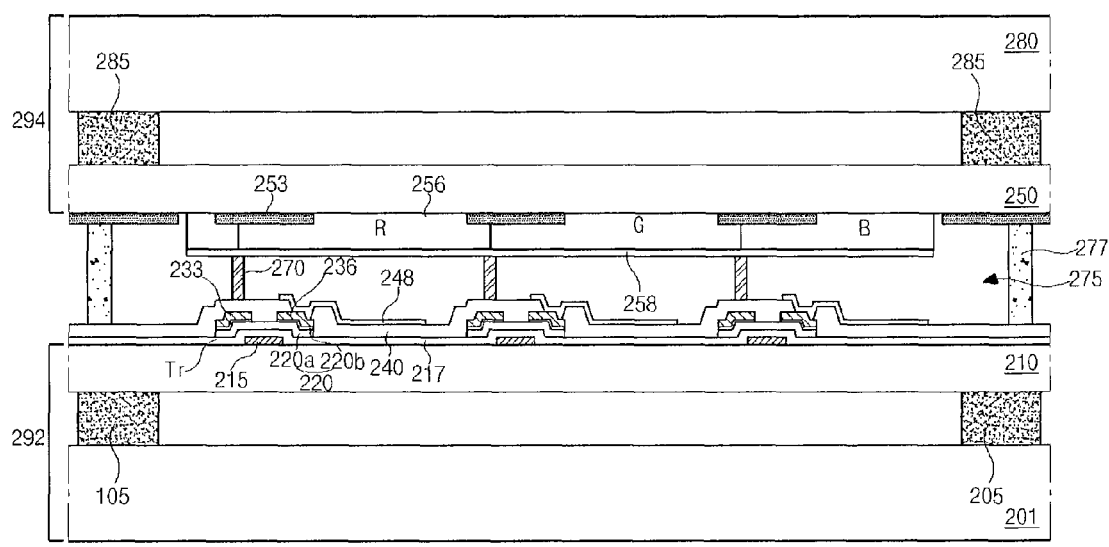

Next, as shown in FIG. 4F, a seal pattern 277 is formed at edges of one of the first and second process panels 292 and 294. Then, the first and second process panels 292 and 294 are disposed such that the pixel electrode 248 faces the common electrode 258. Next, a liquid crystal layer 275 is formed in a space inside the seal pattern 277, and the first and second process panels 292 and 294 are attached such that the patterned spacer 270 contacts the passivation layer 240.

Figure 4G:
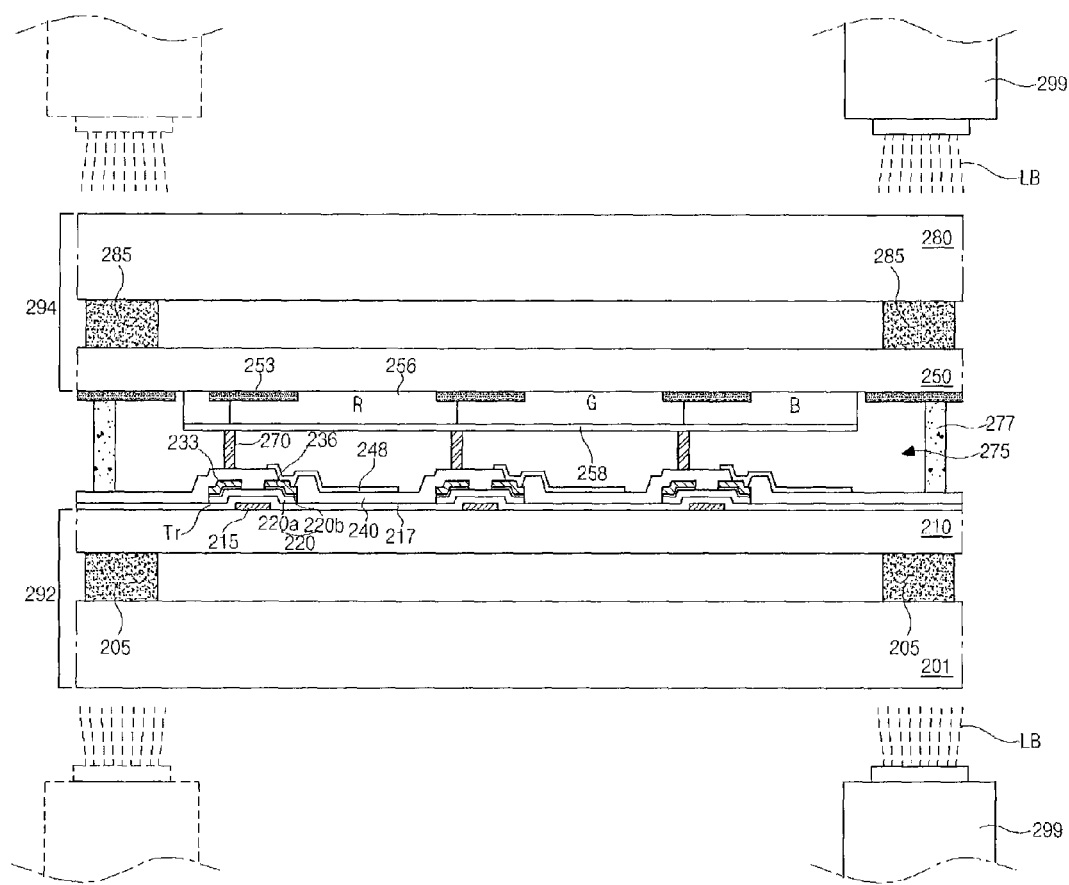

Next, as shown in FIG. 4G, an adhesive strength weakening or reducing process for the first and second adhesive patterns 205 and 285 is performed. For example, a laser beam LB is irradiated onto an outer side of the first and second process panels 292 and 294 using a laser irradiating apparatus 299 to cause a laser ablation. As a result, the adhesive strength of the first and second adhesive patterns 205 and 285 is weakened or reduced. The laser beam LB may be focused on a contact portion between the first adhesive pattern 205 and the first process substrate 210 and between the second adhesive pattern 285 and the second process substrate 250. A source, a power and a wavelength of the laser beam LB for the laser ablation is differ from those of a laser beam for curing the first and second adhesive patterns 205 and 285. By the laser beam irradiation process, each of the first and second adhesive patterns 205 and 285 looses the adhesive property, or the adhesive property of each of the first and second adhesive patterns 205 and 285 is weakened or reduced.

In the present invention, the step of detaching the first and second auxiliary substrates 201 and 280 from the first and second process substrates 210 and 250, respectively, by conducting the laser ablation does not require an additional sacrifice layer for the laser ablation process because the first and second adhesive patterns 205 and 285 serve as the sacrifice layer.

Figure 4H:
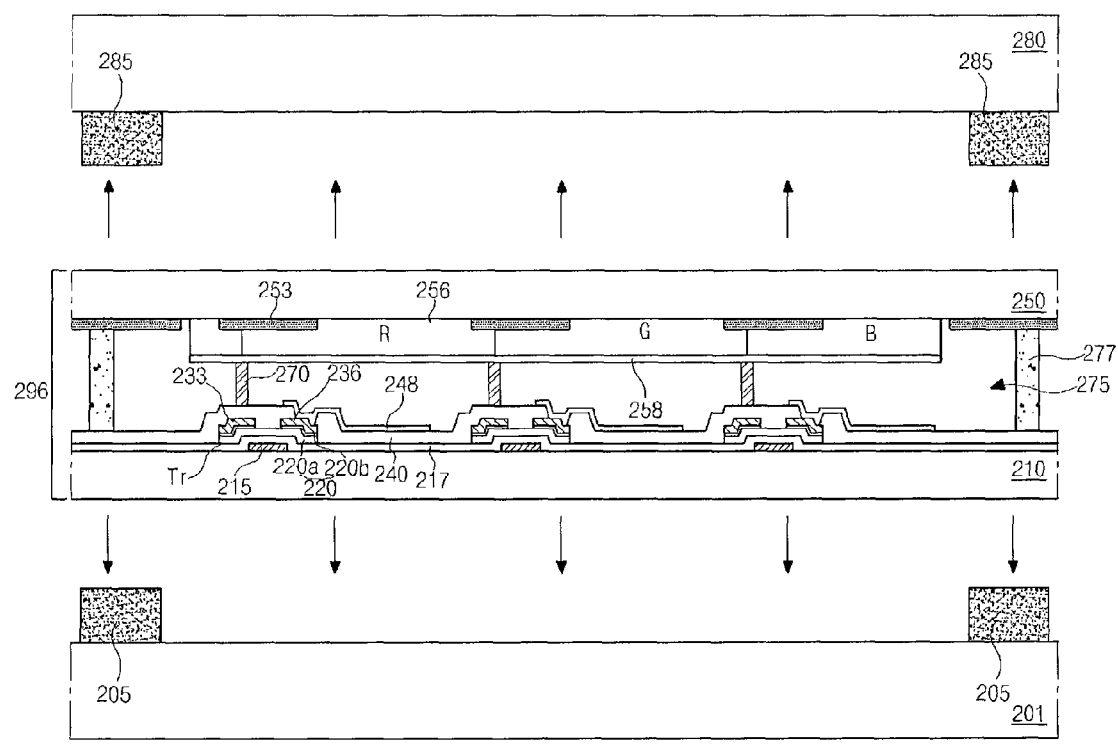

Next, as shown in FIG. 4H, the first auxiliary substrate 201 is detached from the first process substrate 210, and the second auxiliary substrate 280 is detached from the second process substrate 250. As a result, a liquid crystal panel 296 including the first and second process substrates 210 and 250, each of which has a thickness of about 0.1t to about 0.5t, is obtained.

Since an adhesive strength of the first and second adhesive patterns 205 and 285 to the first and second process substrates 210 and 250 is weakened or reduced by the laser beam LB, the first and second auxiliary substrates 201 and 280 are easily detached from the liquid crystal panel 296.

FIGS. 4G and 4H show a process of irradiating the laser beam LB and detaching the first and second auxiliary substrates 201 and 280. Alternatively, after the first and second adhesive patterns 205 and 285 are exposed to an etchant for etching the first and second adhesive patterns 205 and 285, the first and second auxiliary substrates 201 and 280 may be detached from the liquid crystal panel 296.

The first and second auxiliary substrate 201 and 280, which are detached from the liquid crystal panel 296, may be recycled after removing the first and second adhesive patterns 205 and 285. Namely, after completely removing the first and second adhesive patterns 205 and 285, which loose an adhesive property by a laser ablation, from the first and second auxiliary substrates 201 and 280, new first and second adhesive patterns are respectively formed on the first and second auxiliary substrates 201 and 280 in order to recycle.

Each of the first and second process substrates 210 and 250 has a thickness of about 0.1t to about 0.5t. However, since the first and second process substrates 210 and 250 are attached to from the liquid crystal panel 296, a drooping problem of the liquid crystal panel 296 is not generated. In addition, even if the liquid crystal panel 296 is drooped, the liquid crystal panel 296 is drooped to little more than a single glass substrate of 0.1t to 0.7t thickness. Accordingly, there is no problem, e.g., a drooping problem, in the liquid crystal panel 296 during other processes.

Figure 4I:
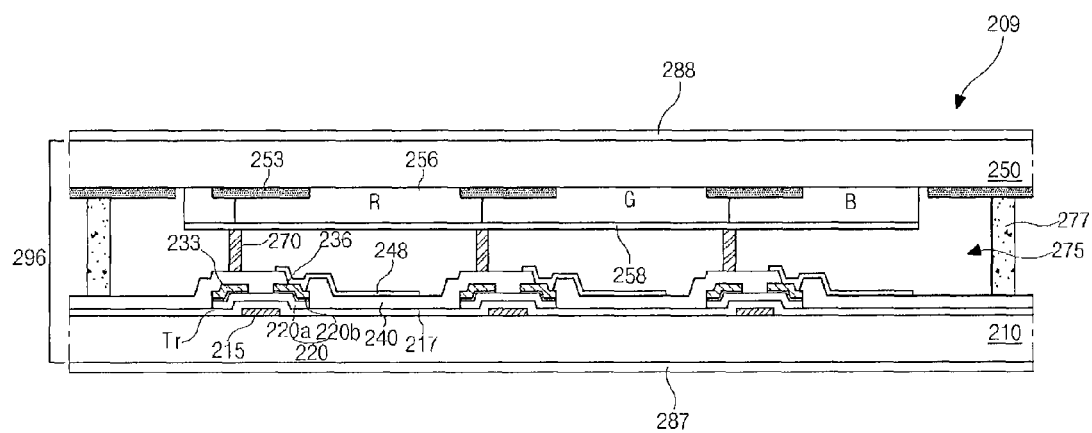

Next, as shown in FIG. 4I, first and second polarizing plates 287 and 288 are attached to an outer side of the first and second process substrates 210 and 250, respectively, such that an LCD device 209 is obtained.

The LCD device, which is fabricated by the above processes and has the 0.1t to 0.5t thickness substrate, has a total thickness smaller than the related art LCD device including the 0.7t thickness glass substrate. In addition, the above LCD device has a weight smaller than the related LCD device. Namely, the LCD device according to the present invention has a lightweight and thin profile.

In addition, since an etching process of an outer side of substrates of a liquid crystal panel to reduce a thickness of the substrates is not required, production yield is improved. Moreover, the 0.1t to 0.5t thickness substrate, which is cheaper than 0.7t thickness substrate, is used such that production cost is reduced. Furthermore, by using the auxiliary substrate, problems, e.g., a drooping problem, are not caused even though a thinner substrate is used.

FIGS. 6A to 6F are cross-sectional views showing processes of fabricating an LCD device according to a third embodiment of the present invention. The LCD device is fabricated by a roll to roll method.

Figure 6A:
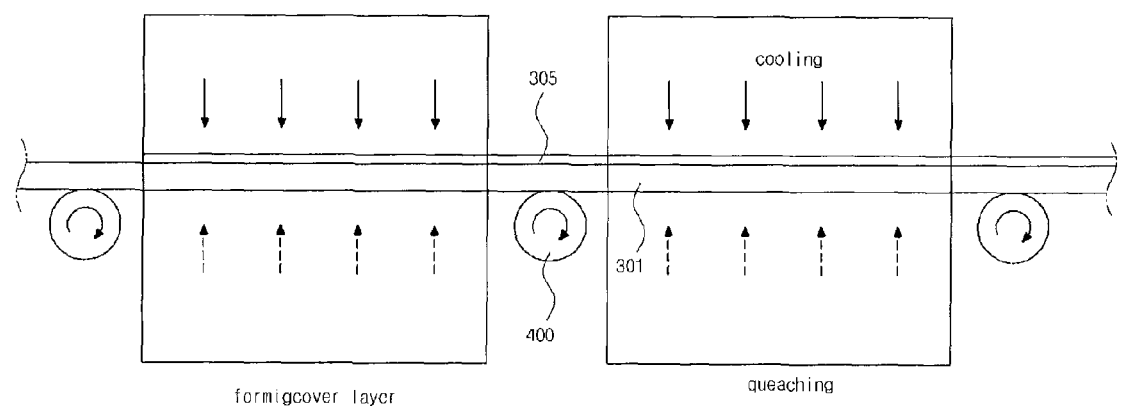
FIGS. 6A to 6F are cross-sectional views showing processes of fabricating an LCD device according to a third embodiment of the present invention.

As shown in FIG. 6A, a diamond-like carbon (DLC) material is deposited on at least one surface of a mother glass substrate 301, which has a thickness of about 0.1t o 0.5t, under a temperature of about 300t o about 500° C. with a thickness of about 0.5t o about 5 μm. The DLC material has a solid structure like a diamond. The DLC material is quenched (rapidly cooled) to form a cover layer 305 onto the mother glass substrate 301. Due to the cover layer 305, a drooping problem of the mother glass substrate 301 is reduced, and a stiffness property of the mother glass substrate 301 is improved. Alternatively, instead of depositing and quenching the DLC material, a transparent glass fiber-reinforced material, e.g., polyvinyl butyral, is coated on at least one surface of the mother glass substrate 301 under a room temperature with a thickness of about 0.5 μm to about 5 μm to form the cover layer 305.

FIG. 6A shows the cover layer 305 on one surface of the mother glass substrate 301. Alternatively, the cover layer 305 may be also formed on both of upper and lower surface of the mother glass substrate 301.

Figure 6B:
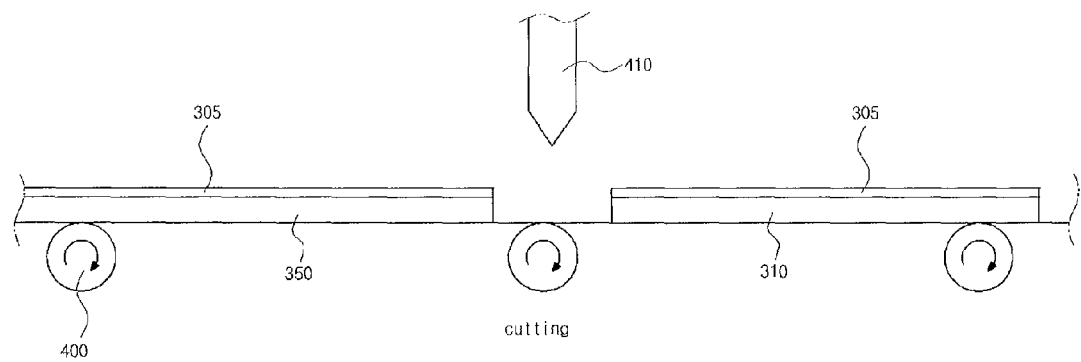

Next, as shown in FIG. 6B, the mother glass substrate 301, on which the cover layer 305 is formed, is cut using a cutting unit 410 to obtain a first substrate 310 and a process substrate 350 used for the LCD device. A combination of the first substrate 310 and the cover layer 305 is referred to as a first process substrate, and a combination of the second substrate 350 and the cover layer 305 is referred to as a second process substrate.

Each of the first and second process substrates 310 and 350, wherein the cover layer 305 is formed, has a drooping problem similar to the 0.7t thickness glass substrate. In addition, a stiffness property of the first and second process substrates 310 and 350 is similar to the 0.7t thickness glass substrate due to the cover layer 305. As a result, even if the mother glass substrate 301 (of FIG. 6A) has a relatively low thickness, the first and second process substrates 310 and 350 are used for the LCD device fabricating apparatus without damage.

Figure 7:
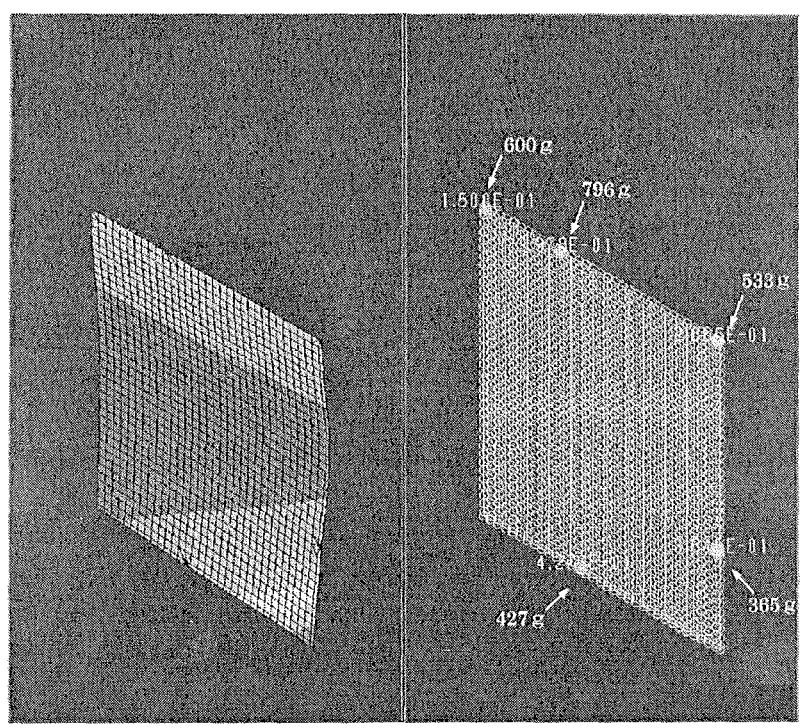
FIG. 7 shows a drooping and a stiffness of a 0.2t thickness glass substrate with a 0.5 cover layer of DLC material according to the third embodiment of the present invention.
Figure 8:
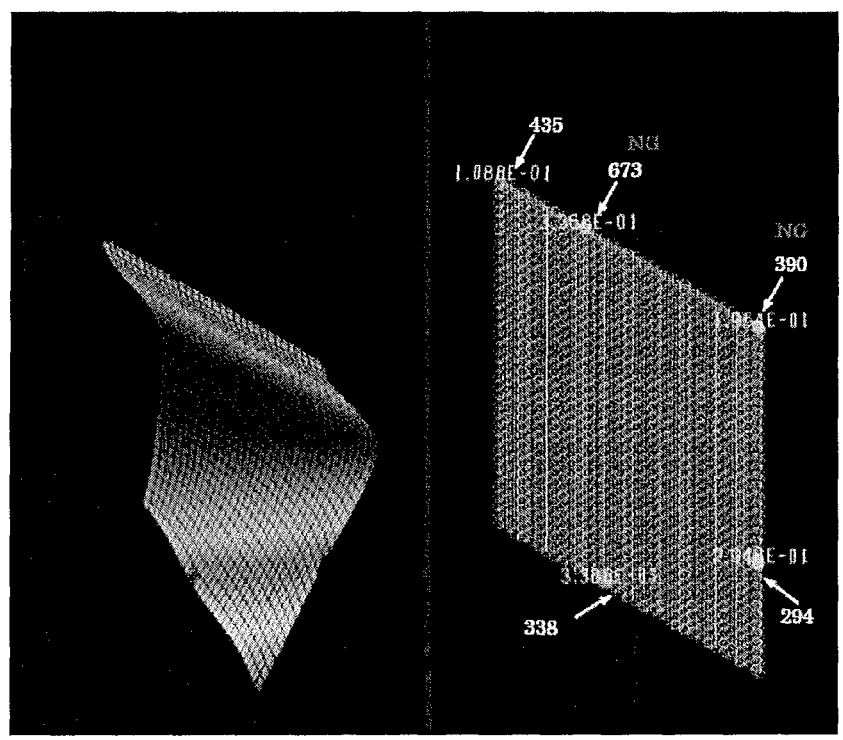
FIG. 8 shows a drooping and a stiffness of a 0.2t thickness glass substrate without the cover layer.

FIG. 7 shows a drooping and a stiffness of a 0.2t thickness glass substrate with a 0.5 μm cover layer of DLC material according to the third embodiment of the present invention, and FIG. 8 shows a drooping and a stiffness of a 0.2t thickness glass substrate without the cover layer.

Referring to FIGS. 7 and 8, the glass substrate with the 0.5 μm cover layer in FIG. 7 is drooped less with compared to the glass substrate in FIG. 8. In addition, an average stiffness of the glass substrate with the 0.5 μm cover layer in FIG. 7 is larger than that of the glass substrate in FIG. 8.

Accordingly, the glass substrate with the cover layer has a reduced drooping problem and an improved stiffness property such that the glass substrate with the cover layer is used for the LCD device fabricating apparatus without any damage.

Figure 6C:
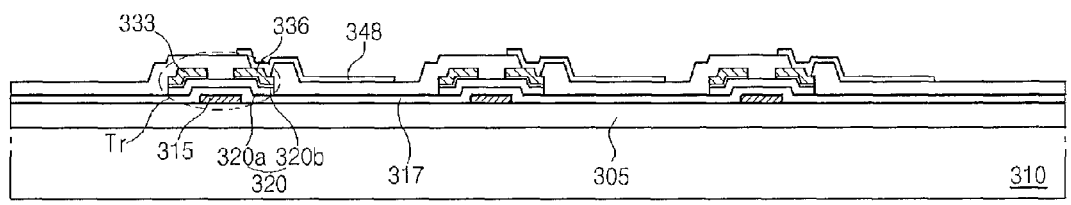

Next, as shown in FIG. 6C, array elements are formed on the first process substrate. Namely, a gate line (not shown) and a data line (not shown) are formed with a gate insulating layer 217 therebetween. The gate and data lines cross each other to define a pixel region. In the pixel region, a thin film transistor (TFT) Tr as a switching element is formed at a crossing portion of the gate and data lines. For example, the TFT Tr may include a gate electrode 315, a semiconductor layer 320, which includes an active layer 320a of intrinsic amorphous silicon and an ohmic contact layer 320b of impurity-doped amorphous silicon, a source electrode 333 and a drain electrode 336. The gate electrode 315 is connected to the gate line, and the source electrode 333 is connected to the data line. The drain electrode 336 is spaced apart from the source electrode 333. A passivation layer 340 is formed on the TFT Tr. The passivation layer 340 includes a contact hole to expose the drain electrode 336 of the TFT Tr. A pixel electrode 348 is formed on the passivation layer 340. The pixel electrode 348 contacts the drain electrode 336 through the contact hole. The pixel electrode 348 is formed of a transparent conductive material.

FIG. 6C shows the array elements, e.g., the gate electrode 315, are formed on the cover layer 305. Alternatively, the array elements may be formed on the first substrate 310.

Next, as shown in FIG. 5D, color filter elements are formed on the second process substrate. Namely, a black matrix 353 is formed at boundaries of the pixel region, and a color filter layer 356 including red, green and blue color filter patterns is formed in the pixel region. Next, a common electrode 358 is formed on the color filter layer 356 by depositing a transparent conductive material. A patterned spacer 370 having a pre-determined height is formed on the common electrode 358. The patterned spacer 370 may correspond to the black matrix 353.

Figure 6D:
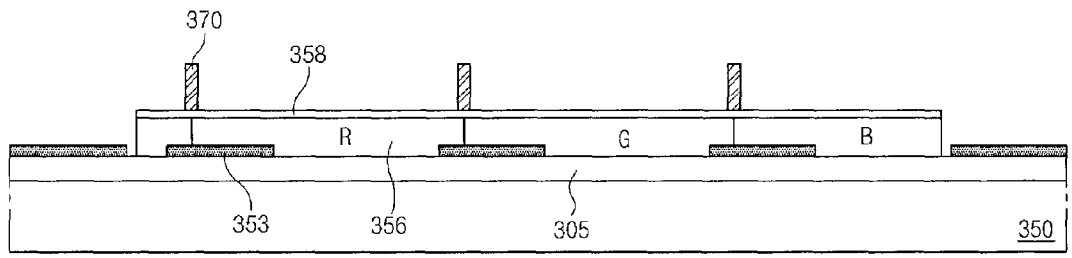

FIG. 6D shows the color filter elements, e.g., the color filter layer 356, are formed on the cover layer 305. Alternatively, the color filter elements may be formed on the second substrate 350.

During these color filter processes, there is no damage on the second substrate 350 because a drooping problem of the second process substrate 350 is substantially same as the 0.7t thickness glass substrate due to the cover layer 305.

Figure 6E:
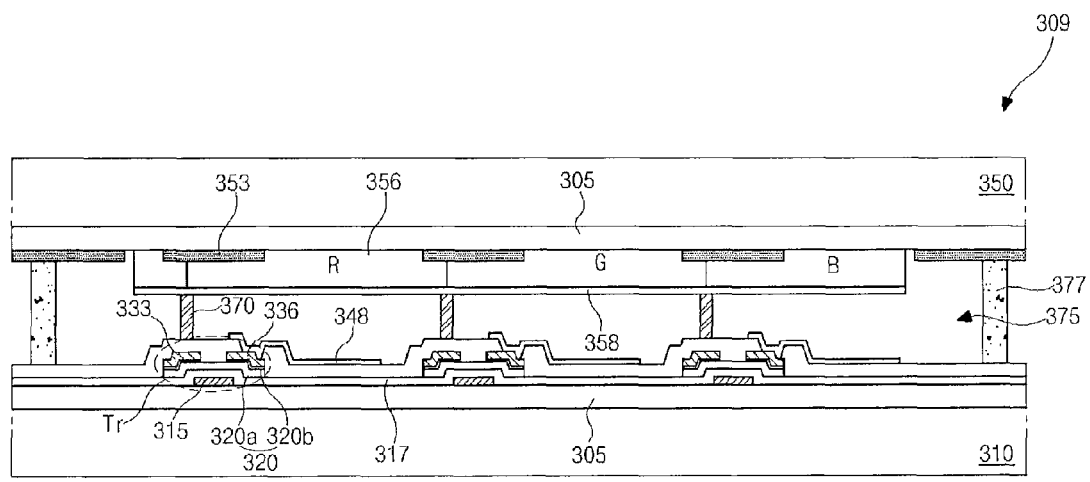

Next, as shown in FIG. 6E, a seal pattern 377 is formed at edges of one of the first and second process substrates. Then, the first and second process substrates are disposed such that the pixel electrode 348 faces the common electrode 358. Next, a liquid crystal layer 375 is formed in a space inside the seal pattern 377, and the first and second process substrates are attached such that the patterned spacer 370 contacts the passivation layer 340.

Figure 6F:
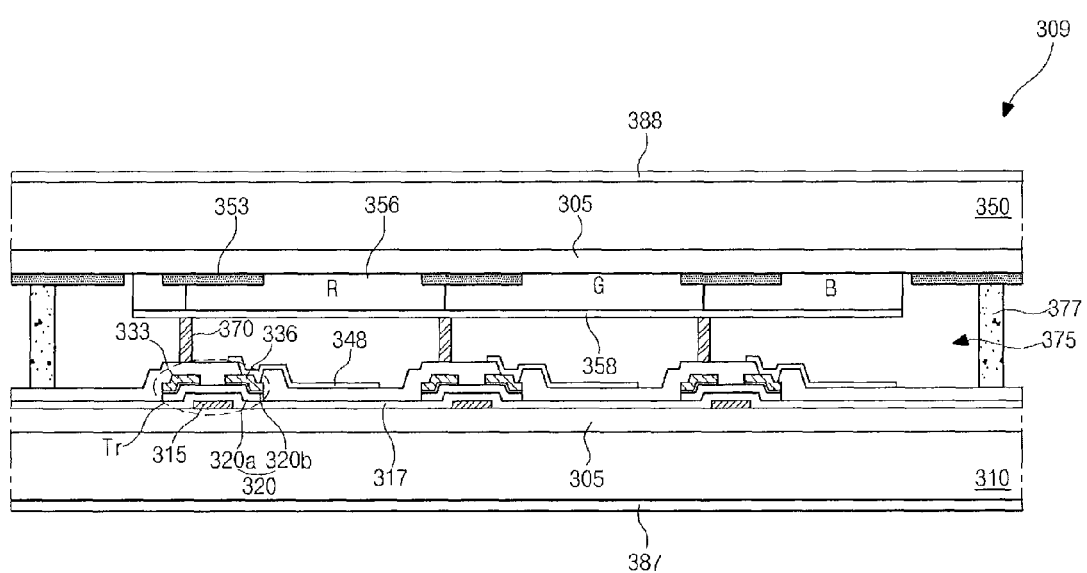

Next, as shown in FIG. 6F, first and second polarizing plates 387 and 388 are attached to an outer side of the first and second process substrates, respectively, such that an LCD device 309 is obtained.

FIG. 6A shows the cover layer is formed on the mother glass substrate. Alternatively, after cutting the mother glass substrate into a unit glass substrate, an auxiliary substrate is attached to the unit glass substrate as illustrated in the first embodiment or the second embodiment. Then, the cover layer is formed on the unit glass substrate by depositing the DLC material or coating the glass fiber-reinforced material, and the auxiliary substrate is detached.

The LCD device, which is fabricated by the above processes and has the 0.1t to 0.5t thickness substrate, has a total thickness smaller than the related art LCD device including the 0.7t thickness glass substrate. In addition, the above LCD device has a weight smaller than the related LCD device. Namely, the LCD device according to the present invention has a lightweight and thin profile.

In addition, since an etching process of an outer side of substrates of a liquid crystal panel to reduce a thickness of the substrates is not required, production yield is improved. Moreover, the 0.1t to 0.5t thickness substrate, which is cheaper than 0.7t thickness substrate, is used such that production cost is reduced.

FIGS. 4A to 4I and FIGS. 6A to 6F show the LCD device including the pixel electrode on the first process substrate and the common electrode on the second process substrate. Alternatively, a lightweight and thin profile type in-plane switching (IPS) mode LCD device including the common electrode, which is connected to a common line, on the first process substrate with the pixel electrode may be fabricated. In this case, the pixel electrode and the common electrode have a bar shape and are alternately arranged with each other. On the second process substrate, the black matrix, the color filter layer and an overcoat layer without the common electrode are formed. The common line may be formed on the same layer and of the same material as the gate electrode.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of fabricating a liquid crystal display device, comprising:
    forming a first adhesive pattern on a first auxiliary substrate having a first thickness;
    forming a first uneven pattern on the first auxiliary substrate, wherein the first uneven pattern is surrounded by the first adhesive pattern and in direct contact with the first auxiliary substrate;
    forming a first process panel by attaching a first substrate having a second thickness smaller than the first thickness to the first auxiliary substrate using the first adhesive pattern;
    forming an array element on the first substrate of the first process panel;
    forming a second adhesive pattern on a second auxiliary substrate having a third thickness;
    forming a second process panel by attaching a second substrate having a fourth thickness smaller than the third thickness to the second auxiliary substrate using the second adhesive pattern;
    forming a color filter element on the second substrate of the second process panel;
    attaching the first and second process panels with a liquid crystal layer between the first and second process panels such that the liquid crystal layer is positioned between the array element and the color filter element;
    weakening an adhesive strength of the first and second adhesive patterns; and
    detaching the first and second auxiliary substrates from the first and second substrates, respectively.

2. The method according to claim 1, wherein each of the first and third thickness is about 0.4t to about 1.0t, and each of the second and fourth thickness is about 0.1t to about 0.5t.

3. The method according to claim 1, wherein each of the first and second auxiliary substrates and the first and second substrates is formed of glass.

4. The method according to claim 1, wherein the step of weakening the adhesive strength includes one of irradiating a laser beam to the first and second adhesive patterns or exposing the first and second adhesive patterns to an etchant.

5. The method according to claim 1, wherein the step of forming the first uneven pattern on the first auxiliary substrate is performed before the step of forming the first adhesive pattern or after the step of forming the first adhesive pattern and before the step of forming the first process panel.

6. The method according to claim 1, further comprising forming a second uneven pattern on the second auxiliary substrate before the step of forming the second adhesive pattern or after the step of forming the second adhesive pattern and before the step of forming the second process panel.

7. The method according to claim 1, wherein the step of forming the array element includes:
 forming a gate line and a data line crossing the gate line;
 forming a thin film transistor connected to the gate line and the data line; and
 forming a pixel electrode connected to the thin film transistor.

8. The method according to claim 7, wherein the step of forming the color filter element includes:
 forming a color filter layer; and
 forming a common electrode facing the pixel electrode.

9. The method according to claim 7, wherein the step of forming the array element further includes forming a common electrode, wherein the pixel electrode and the common electrode are alternately arranged with each other.

10. The method according to claim 9, further comprising forming a transparent electrode on an outer surface of the second substrate.

11. The method according claim 1, further comprising forming a first polarizing plate and a second polarizing plate respectively on an outer side of the first and second substrates after detaching the first and second auxiliary substrates.

12. The method according claim 1, wherein each of the first and second adhesive patterns is formed of one of silsesquioxane, polydimethylsiloxane and acryl based adhesive material.

13. The method according to claim 12, wherein the step of forming the first process panel includes curing the first adhesive pattern by a heat or a laser beam, and the step of forming the second process panel includes curing the second adhesive pattern by a heat or a laser beam.

14. The method according to claim 1, wherein each of the first and second adhesive pattern is formed of a frit.

15. The method according to claim 14, wherein the step of forming the first process panel includes curing the first adhesive pattern by a laser beam, and the step of forming the second process panel includes curing the second adhesive pattern by a laser beam.

16. The method according to claim 1, wherein each of the first and second adhesive patterns has one of a single rectangular shape, a dual rectangular shape, a multi rectangular shape and a lattice shape.

17. A method of fabricating a liquid crystal display device, comprising:
 forming a first process panel by forming a first cover layer on a first substrate;
 forming an array element on the first substrate of the first process panel;
 forming a second process panel by forming a second cover layer on a second substrate;
 forming a color filter element on the second substrate of the second process panel; and
 attaching the first and second process panels with a liquid crystal panel between the first and second process panels,
 wherein each of the first and second cover layers is formed of a diamond-like carbon material or a glass fiber-reinforced material, and
 wherein each of the step of forming the first process panel and the step of forming the second process panel includes a step of forming a cover material layer on a mother glass substrate and a step of cutting the mother glass substrate to form the first and second process panel.

18. The method according to claim 17, wherein each of the first and second substrates has a thickness of about 0.1t to about 0.5t, and each of the first and second cover layers has a thickness of about 0.5 μm to about 5 μm.

19. The method according to claim 17, further comprising:
 attaching a first auxiliary substrate to the first substrate before the step of forming the first process panel;
 attaching a second auxiliary substrate to the second substrate before the step of forming the second process panel; and
 detaching the first and second auxiliary substrates from the first and second substrates, respectively, after the step of attaching the first and second process panels.

20. The method according to claim 17, wherein the step of forming the array element includes:
 forming a gate line and a data line crossing the gate line;
 forming a thin film transistor connected to the gate line and the data line; and
 forming a pixel electrode connected to the thin film transistor.

21. The method according to claim 20, wherein the step of forming the color filter element includes:
 forming a color filter layer; and
 forming a common electrode facing the pixel electrode.

22. The method according to claim 20, wherein the step of forming the array element further includes forming a common electrode, wherein the pixel electrode and the common electrode are alternately arranged with each other.

23. The method according to claim 22, further comprising forming a transparent electrode on an outer surface of the second substrate.

24. A method of fabricating a liquid crystal display device, comprising:
 forming a first process panel by forming a first cover layer on a first substrate;
 forming an array element on the first substrate of the first process panel;
 forming a second process panel by forming a second cover layer on a second substrate;
 forming a color filter element on the second substrate of the second process panel; and
 attaching the first and second process panels with a liquid crystal panel between the first and second process panels,
 wherein each of the first and second cover layers is formed of a diamond-like carbon material, and wherein the diamond-like carbon material is deposited under a temperature of about 300 to about 500° C. is quenched to form the first and second cover layers.

25. A method of fabricating a liquid crystal display device, comprising:
 forming a first process panel by forming a first cover layer on a first substrate;

forming an array element on the first substrate of the first process panel;
forming a second process panel by forming a second cover layer on a second substrate;
forming a color filter element on the second substrate of the second process panel; and
attaching the first and second process panels with a liquid crystal panel between the first and second process panels,
wherein each of the first and second cover layers is formed of a diamond-like carbon material, and wherein the glass fiber-reinforced material includes polyvinyl butyral.

* * * * *